United States Patent [19]

Baker

[11] Patent Number: 4,651,464
[45] Date of Patent: Mar. 24, 1987

[54] INSECT SWATTER HAVING CONTINUOUS PLANAR SOFT AND RIGID SURFACES

[76] Inventor: Timothy F. Baker, 16937 Glenfold Dr., Hacienda Heights, Calif. 91745

[21] Appl. No.: 885,537

[22] Filed: Jul. 14, 1986

[51] Int. Cl.[4] ............................................. A01M 3/02
[52] U.S. Cl. ...................................................... 43/137
[58] Field of Search ............................................ 43/137

[56] References Cited

U.S. PATENT DOCUMENTS

| | | | |
|---|---|---|---|
| 1,185,855 | 6/1916 | Stinson | 43/137 |
| 2,015,092 | 9/1935 | Turnquist | 43/137 |
| 2,806,320 | 9/1957 | Griffith | 43/137 |
| 3,673,730 | 7/1972 | Hegenberger | 43/137 |
| 4,242,828 | 1/1981 | Schurger et al. | 43/137 |

Primary Examiner—M. Jordan

[57] ABSTRACT

A two surface insect swatter is presented. The swatter comprises a relatively rigid generally linear handle, having an interior surface near a first end defining a C-shaped interior coupling surface about one inch in diameter. A foam, soft, generally planar swatting surface is coupled to the handle and comprises the first swatting surface. A flexible-rigid relatively tough swatting surface coplanar with and of substantially identical heighth and width to and generally coextensive with and coupled to the soft swatting surface comprises the second swatting surface.

5 Claims, 6 Drawing Figures

INSECT SWATTER HAVING CONTINUOUS PLANAR SOFT AND RIGID SURFACES

BACKGROUND OF THE INVENTION

1. Field of the Invention

The present invention relates to insect swatters.

2. Description of the Prior Art

Insect swatters also called herein fly swatters have been known for many years. When you need one, nothing else is quite so handy. Nevertheless, those known to the prior art have defects. I have swatted at and missed many a fly I would have hit if the swatter had been only a little bit bigger. One doesn't want it so big as to become unwieldly or so big as to make it hard to get into cracks or corners or hard to reach places, but a somewhat larger fly swatter would be effective. Applicant's research has shown that the ideal size is approximately 9 inches plus or minus one inch square which gives a total surface area of about one-half square foot.

In addition, who has not seen ugly insect remains on walls? For most people, the purpose of a fly swatter is to get rid of flies, not to put up miniature trophies on the wall similar to the hanging head of an animal only substantially smaller. Unfortunately, walls are hard, fly swatters are hard, and insects are relatively fragile when squeezed between two hard surfaces. Accordingly, what is needed but not found in the prior art is a fly swatter which is capable of killing flies and yet has a soft enough surface so that no remains are squished into the wall.

Part of the reason for this lack in the prior art is the unfortunate fact that flies will sometimes light on a soft surface such as a rug. In that case, if you hit them with a very soft surface, they would be squeezed between two soft surfaces and would get away. Accordingly, what is needed is a fly swatter with a variable hardness surface so that the surface hardness can be adjusted depending on what the fly is resting on. The present invention comprises and basically accomplishes this by providing two generally coextensive surfaces, one hard and one soft.

After you hit the fly, unfortunately, he does not go away. Unless you want a large quantity of dead fly bodies or other insect bodies laying around your house, you'd have to pick the thing up and throw it away. With prior art fly swatters, there is no convenient way to do this, and frequently people will get toilet paper, wrap the toilet paper around the fly, and dispose of the remains. What is needed but not found in the prior art is some handy way of transferring the fly to a surface which need not be kept so clean as to prevent it from carrying a fly, and permit the fly to be easily carried to a place where it can be disposed of. The present fly swatter contains such an arrangement.

SUMMARY OF THE INVENTION

A two surface insect swatter is presented. The swatter comprises a sustantially rigid generally linear handle, having an interior surface near a first or holding end disposed away from the swatter which surface defines a C-shaped interior coupling surface about on einch in diameter.

The swatter comprises two generally coextensive surfaces. The first comprises a foam, soft, generally planar swatting surface about three-sixteenths inches thick of generally rectangular shape of about one-half square foot in area. The ideal size for the swatting surface has been found by experiments to be about 8 inches plus or minus one inch square. The swatting surface is fixedly coupled along the midpoint of a first edge to the second end of the handle which is adjacent the swatting surface. The foam tapers at about a thirty degree angle to form a ramp extending to the edge of the foam from the surface along the center of the edge opposite the first edge. By this is meant that as the foam approaches its edge, it gets thinner until at the edge there is essentially no foam.

A relatively rigid relatively tough swatting surface which may be fabricated from polyethylene or some other impervious plastic which does not react chemically and is easy to clean and does flex a little bit but not much is also utilized. The tough swatting surface is coplanar with and of substantially identical height and width to and generally coextensive with and coupled to and has a surface coplanar with a surface of the soft swatting surface.

The invention further includes a relatively rigid (by this is meant that it will bend or flex a little bit, but is relatively rigid) elongated strip about four inches long and about one inch wide at a first end tapering to a second end narrower than the first end. The second end surface defines an interior generally circular but expandable surface of diameter slightly less than the greatest distance between the interior surface defined by the C-shaped interior coupling surface of the handle and the adjacent handle exterior surface. This permits the strip to be coupled to the end of the handle.

In operation, the soft surface is used to swat insects on hard surfaces and the hard surface is used to swat insects on soft surfaces or in the air. The four inch long strip is used to push the insect remains up the ramp formed by the soft surface onto the soft surface so that the remains can be carried to a suitable place for disposal without touching.

The soft surface and the opposite relatively rigid surface form a composite generally planar swatting member coupled to the second end of the handle, said swatting member having the first soft generally planar swatting surface and an opposite relatively rigid swatting surface coupled to and coplanar with the soft swatting surface.

In one example, the soft generally planar swatting surface tapers at about a 30° angle in a selected area near a selected edge. Accordingly, along a selected portion of the edge, the edge of the composite comprises the relatively rigid swatting surface, to form a ramp for the easy and convenient sweeping of swatted insects onto the composity member by the use of the shovel strip which has been removed from the C-shaped interior coupling surface for the purpose of sweeping. The C-shaped interior coupling surface is capable of being used for two purposes, coupling to the shovel strip and coupling to a protrusion from a wall such as a nail from which the insect swatter can be conveniently hung when not in use.

The soft swatting surface may comprise foam about 3/16 inches thick. The swatting member in a first example is of generally rectangular shape with rounded corners about ½ square foot in area. The relatively rigid swatting surface is a smooth, waterproof surface fabricated from a stron only slightly flexible, thin material such as polyvinyl chloride. The shovel strip is about 4 inches long and 1 inch wide at its greatest width near one end, and tapers to a second end narrower than the first end. The second end surface defines an interior generally circular but expandable surface of the diameter slightly less than the greatest distance between the interior surface defined by the C-shaped interior coupling surface of the handle and the adjacent handle exterior surface. The expandable surface is generally Q-shaped so that the Q-shaped surface couples securely to the C-shaped interior coupling surface of the handle. However, the Q-shaped surface can be distorted when necessary to remove the strip from the handle and when necessary to replace the strip on the handle so that the strip is capable of being removably coupled to the handle. The C-shaped interior coupling surface of the handle is about 1 inch in diameter.

The 30° angle ramp may be adjacent one of the corners of the swatting member farthest from the handle. Alternatively, the 30° taper which forms the ramp may be along the edge of the swatting member farthest from the handle and is symmetric to the axis of the handle. The surface of the swatting member may be made totally waterproof and smooth and capable of being washed without damage to the swatting member and without wetting the interior of the swatting member.

Doorknob shanks are ⅞ inches in diameter. A preferred example of the invention has a generally rectangular cylindrical handle 1⅛ inch wide and relatively narrow in demension 90° disposed from the 1⅛ inch wide side and having an interior surface near the end away from the swatter defining an offset partial circle 1 1/16 inch in diameter sufficient offset such that the edge of the handle defines a chord exactly ¾ inches long permitting the end of the handle defining said C shaped partial circle to snap securely over the shanks of standard doorknobs or hang on anything smaller than a standard doorknob.

The foam is medium density, medium compressible foam. The swatter works so well because when it swats against a surface, there is little air flow and gradual air compression until the swatter is very close to the surface. The air then compresses rapidly and flows out from between the swatter and surface and surface rapidly, but the insect being many times more dense than the air cannot accelerate rapidly and is swatted between the swatter and the surface. The same physical conditions make mid air swatting by the hard consistency easy to clean plastic surface effective as well as swatting against a soft surface by the plastic surface.

DRAWING DESCRIPTION

Reference should be made at this time to the following detailed description which should be read in conjunction with the following drawings, of which:

DETAILED DESCRIPTION

Figure 1:
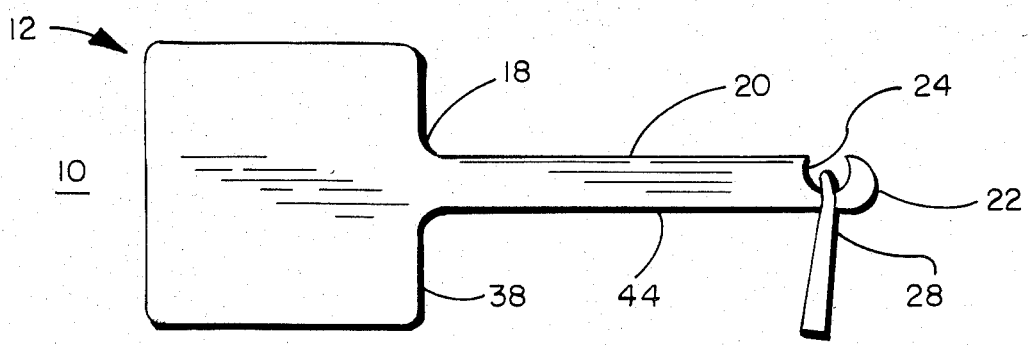
FIG. 1 shows a side view of a two surface insect swatter according to the present invention.
Figure 2:
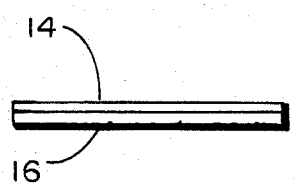
FIG. 2 shows a side view of the swatter end illustrating the two surfaces.
Figure 3:
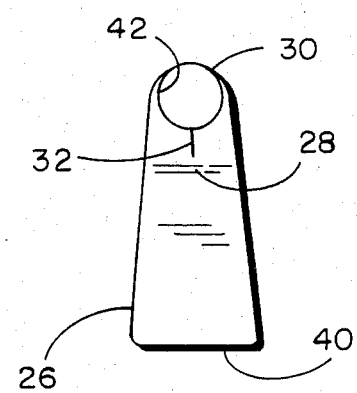
FIG. 3 illustrates a strip used to place insects on the swatter for carrying and disposal.

Reference should be made at this time to FIGS. 1-6 which illustrate various views of a two surface insect swatter 10 according to the present invention. The swatter includes a swat end 12 and a holding end 22. The swat end 12 comprises a foam, soft, generally planar swatting surface 16 about three-sixteenths of an inch thick, of generally rectangular shape about 9 inches plus or minus one inch square and accordingly having an area about one-half square foot. The swatting surface 16 is fixedly coupled along the midpoint of a first edge to the second end 18 of a handle 20. The foam of the foam surface 16 tapers at about a thirty degree angle to form an incline 34 which in turn forms a ramp 34 extending to the edge 36 of the foam 16 along the center of the edge 36. The edge 36 is opposite to the edge 38 which is coupled to the handle 20.

A flexible - rigid relatively tough swatting surface 14 is coplanar with and of substantially identical height and width to and generally coextensive with and coupled to the soft swatting surface 16.

A rigid generally linear handle 20 having an interior surface near a first or holding end 22 which surface defines a C-shaped interior coupling surface 24 about one inch in diameter is coupled at end 18 to the two surface 14, 16 swatting end 12 of the swatter 10.

In order to push dead insects onto the foam surface 16 up the ramp 34, a flexible - rigid elongated strip 28 or shovel 28 is provided. The strip 28 is about four inches long and about one inch wide at a first wide end 40. The strip 28 tapers from the wide end 40 to a narrow end 30 also referred to as a shovel coupler 30 which is the narrower second end 30 of the strip 28. The second end surface defines an interior generally circular but expandable surface 42 diameter slightly less than the greatest distance between the interior surface defined by the C-shaped interior coupling surface 24 of the handle 20 and the adjacent handle exterior surface 44.

The hole defined at the holding end 22 in a first example is circular and exactly 1 1/16 inches in diameter with an opening in the C about ¾ inches long. These dimensions permit the handle to snap over doorknobs, hang on cupboard knobs, water pipes, over nails, and in a wide variety of other locations.

The best example of the invention weighs about 5½ ounces, to permit easy wrist flicking yet have enough mass to accomplish its purpose when hitting the insect. The foam at 3/16 inch thick is exactly right to maximize the chance of immobilizing the target without smashing it. A thicker foam lets the target escape while a thinner foam squashes in a substantial percentage of cases.

Obviously if the foam characteristics were changed, a slightly thicker or thinner foam might be suitable, but if the foam is made thinner a substantial number of insects will be squashed by squeezing between the wall and the inside hard swatter surface (not shown) adjacent the foam. The preceeding example appears to work well for all flying and almost all, except the most armored crawling insects on all surfaces.

The relatively large swat end 12 swatting surface 16 not only makes hitting more sure and with sufficient impact to immobilize the target, but also causes a shock wave to preceed the swatting surface 16 because of the compression of the air being pushed by the swatting surface 16. In practice, with a prior art swatter permitting air flow therethrough, certain insects detect the swatting surface and dodge. If an insect is swatted against a wall with the swatting surface 16, the insect does not normally move until the swatting surface is about an inch or less from the wall, much too late for escape. The air compresses between the swatting surface 16 and the wall or in front of the swatting surface in an air strike of an insect or target and the compression of the air and shock wave seems to temporarily immobilize the insect. Perhaps there is some mechanism in insects that immobilizes them temporarily when there is a rapid change in air pressure. One could see how that might have survival benefits under certain circumstances. The swatting surface 16 in the best example is generally square except for a slight flattened V extension toward the handle and rounding at corners and is about 8¾ inches wide. Any larger, and velocity of swatting is sufficiently reduced so that the added surface area does not compensate for the reduction in swatting velocity and a larger number of targets escapes. In addition, greater size of swatting surface 16 makes the swatter 10 harder to use in areas which are not totally open such as corners and near furniture. Making the swatting surface 16 smaller does not substantially increase swatting velocity and the marginal increase in velocity is more than compensated for by the reduced surface area, thereby permitting a larger percentage of targets to escape. The shock wave and compressed air cover a substantially smaller cross section as swatting surface 16 area is reduced, and this reduction also may permit more insects to escape. In practice, the previously described dimensions seem to be better than any tiny modification and one could claim that they are the perfect dimensions.

The fact that the swatting surface 16 has no holes is very important. A similar shaped surface with holes would have a slightly greater swatting velocity but would not be preceeded by the compressed air and shock waves caused by the present swatting surface 16. The compressed air and shock wave result in a higher percentage of hits of insects than the slightly greater velocity of a swatting surface having holes therethrough. The preceeding characteristics are especially important in increasing the percentage success of air hits.

An added feature of the present design is that because of the weight distribution, when hung along a wall, the swatter 10 hangs straight down. It is inexpensive to put an attractive painting on the hard surface 14. This has two advantages. The foam is so soft it stays clean so the surface adjacent the wall is clean. In addition, you have a fantastically different looking attractive painting hung in an amazingly different fashion from the wall. Visitors do not even think it has a function. They think it is nothing more than a fantastic new style of art. An example of the art work is enclosed.

The center of the C shaped interior coupling surface 24 or hole defined thereby are nearly along the axis of the swatter 10 and handle 20. The swatter 10 and handle 20 are symmetric about the axis except for the volume removed to form the C shaped interior coupling surface 24.

The narrow end 30 of the strip 36 is very thin, as thin as consistent with strength so that the portion 30 does not break.

Figure 5:
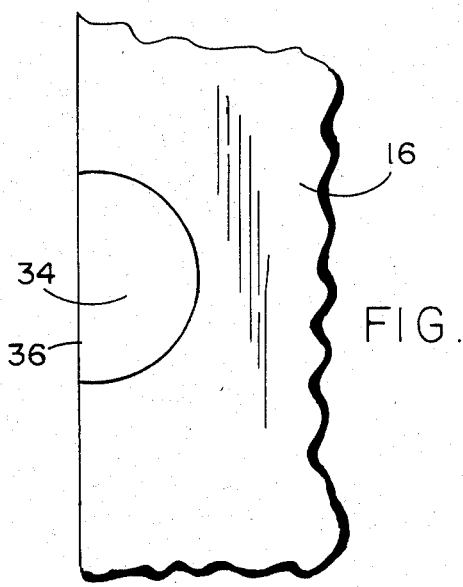
FIG. 5 illustrates the swatter and a ramp thereon for the convenient pushing on to the swatter of swatted insects by the strip.
Figure 4:
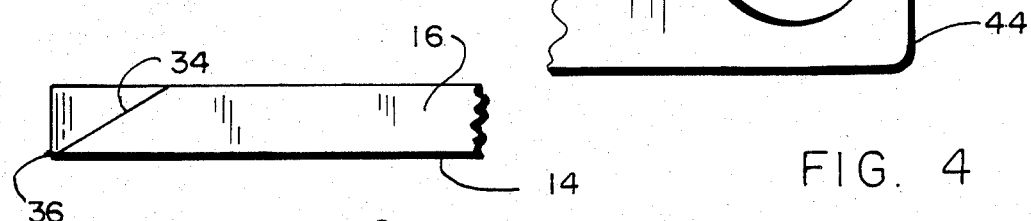
FIG. 4 illustrates the end of the handle farthest from the swatter in a slightly different configuration than that shown in FIG. 1.

The shovel strip 28 is about 4 inches long in a preferred example and 1 inch wide at its greatest width near one end 40 and tapers to a second end 30 narrower than the first end 40. The second end 30 interior surface 42 defines an interior generally circular but expandable surface of diameter slightly less than the greatest distance between the interior surface defined by the C shaped interior coupling surface 24 of the handle 20 and the adjacent handle 20 exterior surface. Said expandable surface 42 of the strip 28 is generally Q shaped with a slit 32 forming the tail of the Q so that the Q shaped surface 42 couples securely to the C shaped interior coupling surface 24 of the handle 20 but the Q shaped surface 42 can be distorted when necessary by spreading the slit 32 to remove the strip 28 from the handle 20 and when necessary to replace the strip 28 on the handle 20 so that the strip 28 is capable of being removably coupled to the handle 20. The C shaped interior coupling surface 24 of the handle 20 is about 1 inch in diameter or slightly more than 1 inch in diameter. The 30° angle ramp 34 may be adjacent a corner of the swatting member 12 farthest from the handle 20 in FIG. 6 or along the opposite edge 36 as shown in FIG. 5.

Figure 6:
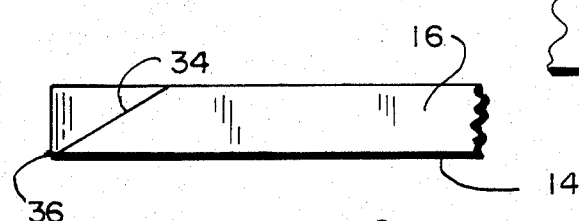
FIG. 6 shows a side view of the swatter with the ramp previously shown in FIG. 5 at a corner instead of disposed along the edge farthest from the handle.

The surface comprising surfaces 14, 16 of the swatting member 10 in a preferred example is waterproof and smooth and capable of being washed without damage to the swatting member 10 and without wetting the interior of the swatting member 10. The 30° taper 34 may be along the edge 36 of the swatting member 10 farthest from the handle 20 and symmetric to the axis of the handle 20. The foam surface 16 may be made smooth and easily washable by having its edge as best shown at the top of FIG. 6 comprised of thin smooth flexible plastic such as poly vinyl chloride.

In the most preferred example, the C shaped interior coupling surface 24 is defined by an offset partial circle 1 1/16 inches in diameter defined by the interior surface of a generally rectangular cylindrical handle 20 (shown in FIG. 1) 1⅛ inches wide and relatively narrow in dimension (not shown because it has no features other than a rectangle) 90° disposed from the 1⅛ inch wide side and having an interior surface 24 near the end 22 away from the swatter 12 defining said partial circle 24 sufficiently offset that the edge of the handle defines a chord (no number since it is just the empty space where the C opens) ⅜ inches long permitting the end 22 of the handle 20 defining said C shaped partial circle 24 to snap securely over the shanks of standard doorknobs or hang on anything smaller than a standard doorknob (not shown).

The soft generally planar swatting surface 16 should be made from medium density, medium compressible foam or the equivalent for best results.

A particular example of the invention has been disclosed herein. Others examples will be obvious to those skilled in the art. The invention is limited only by the following claims.

What is claimed is:

1. A two surface insect swatter, comprising:
   a rigid generally linear handle, having an interior surface near a first end defining a C-shaped interior coupling surface; and
   a composite generally planar swatting member coupled to a second end of the handle, said swatting member consisting of a first soft generally continuous planar swatting surface and an opposite relatively rigid continuous planar swatting surface coupled to and planar coextensive with the soft swatting surface.

2. The invention of claim 1, wherein a shovel strip is removably coupled to the C-shaped interior coupling surface, and the soft generally planar swatting surface tapers at about a 30° angle in a selected area near a selected edge so that along a selected portion of the edge, the edge of the composite comprises the relatively rigid swatting surface, to form a ramp for the easy and convenient sweeping of swatted insects onto the composite member by the use of the shovel which has been removed from the C-shaped interior coupling surface for the purpose of sweeping, wherein the C-shaped interior coupling surface is capable of being used for two purposes, coupling to the shovel strip and coupling to a protrusion from a wall such as a nail from which the insect swatter can be conveniently hung when not in use.

3. The invention of claim 2, wherein the soft swatting surface comprises foam about 3/16 inches thick, the swatting member is of generally rectangular shape with rounded corners about ½ square foot in area, the relatively rigid swatting surface is a smooth, waterproof surface fabricated from a strong only slightly flexible, thin material such as polyvinyl chloride, the shovel strip is about 4 inches long and 1 inch wide at its greatest width near one end, and tapers to a second end narrower than the first end, the second end surface defining an interior generally circular but expandable surface of diameter slightly less than the greatest distance between the interior surface defined by the C-shaped interior coupling surface of the handle and the adjacent handle exterior surface, said expandable surface being generally Q-shaped so that the Q-shaped surface couples securely to the C-shaped interior coupling surface of the handle but the Q-shaped surface can be distorted when necessary to remove the strip from the handle and when necessary to replace the strip on the handle so that the strip is capable of being removably coupled to the handle, and the C-shaped interior coupling surface of the handle is about 1 inch in diameter, and the 30° angle ramp is adjacent one of the corners of the swatting member farthest from the handle.

4. The invention of claim 2, wherein the surface of the swatting member is waterproof and smooth and capable of being washed without damage to the swatting member and without wetting the interior of the swatting member and the 30° taper is along the edge of the swatting member farthest from the handle and is symmetric to the axis of the handle.

5. The invention of claim 2, wherein the C shaped interior coupling surface is defined by an offset partial circle 1 1/16 inches in diameter defined by the interior surface of a generally rectangular cylindrical handle $1\frac{1}{8}$ inches wide and relatively narrow in dimension 90° disposed from the $1\frac{1}{8}$ inch wide side and having an interior surface near the end away from the swatter defining said partial circle sufficiently offset such that the edge of the handle defines a chord ¾ inches long permitting the end of the handle defining said C shaped partial circle to snap securely over the shanks of standard doorknobs or hang on anything smaller than a standard doorknob; and the soft generally planar swatting surface is made from medium density, medium compressible foam.

* * * * *